United States Patent [19]

Vaughan

[11] 4,091,079

[45] May 23, 1978

[54] ZEOLITE VK-2

[75] Inventor: David Evan William Vaughan, Columbia, Md.

[73] Assignee: W. R. Grace & Co., New York, N.Y.

[21] Appl. No.: 833,844

[22] Filed: Sep. 16, 1977

Related U.S. Application Data

[63] Continuation-in-part of Ser. No. 675,381, Apr. 9, 1976, abandoned, which is a continuation-in-part of Ser. No. 512,232, Oct. 7, 1974, abandoned.

[51] Int. Cl.$^2$ ............................................. C01B 33/28
[52] U.S. Cl. ................................ 423/328; 252/455 Z; 423/329
[58] Field of Search ................................ 423/328–330, 423/118; 252/455 Z

[56] References Cited

U.S. PATENT DOCUMENTS

| | | | |
|---|---|---|---|
| 2,882,243 | 4/1959 | Milton | 423/328 |
| 3,306,922 | 2/1967 | Barrer et al. | 423/328 X |
| 3,355,246 | 11/1967 | Kuehl | 423/328 |
| 3,493,518 | 2/1970 | Jonassen et al. | 423/328 |
| 3,755,538 | 8/1973 | Albers et al. | 423/329 |

FOREIGN PATENT DOCUMENTS 984,502  2/1965  United Kingdom ................ 423/328

*Primary Examiner*—Edward J. Meros
*Attorney, Agent, or Firm*—Arthur P. Savage; W. W. McDowell, Jr.

[57] ABSTRACT

A crystalline aluminosilicate zeolite having a silica/alumina ratio of about 2 to 4 and a unique crystal structure is produced by having potassium ions and vanadia ions present in the reaction mixture.

8 Claims, No Drawings

ZEOLITE VK-2

This application is a continuation-in-part of Ser. No. 675,381 filed Apr. 9, 1976, now abandoned, which is a continuation-in-part of Ser. No. 512,232 filed Oct. 7, 1974, now abandoned.

This invention relates to a new aluminosilicate zeolite adsorbent and catalyst. Further, this invention relates to a method for producing a new crystalline phase for an aluminosilicate having a silica/alumina ratio of 2 to 4.

Aluminosilicate zeolites are crystalline materials which have unique ion exchange, adsorbent and catalytic properties. These zeolites exist in various silica/alumina ratios, and have differing pore size dimensions. Common characteristics, however, are their crystallinity and their ion exchange and adsorbent properties. The known zeolites at this time fall into two broad classifications. There are those which are produced by chemical synthesis and those which are naturally occuring and are recovered by a mining operation. Illustrative of the synthesized zeolites are those designated zeolite A, zeolite X and zeolite Y by the Linde Division of the Union Carbide Corp., and those designated as Z-12 and Z-14 by the Davison Division of W. R. Grace & Co. Illustrative of the naturally occurring zeolites are faujasite, erionite, offretite, chabazite, gmelenite, mordenite and heulandite. There are many other synthetic and naturally occurring zeolites which are presently known.

Briefly, this invention consists of a new aluminosilicate structure which has a silica/alumina ratio of 2 to 4. This new structure for a zeolite having this silica/alumina ratio range is produced by having both potassium and pentovalent vanadia ions present in the precursor reaction admixture. Although the pentavalent vanadia ions, since they are tetrahedral at high pH, could theoretically replace alumina or silica in the zeolite structure, this does not seem to occur to any significant extent, although at high vanadia concentrations, small amounts of $V_2O_5$ are found. Vanadia ions seem to polymerize to each other at the synthesis pH range, and it is considered that this affects the crystallization of the aluminosilicate which forms. Also, potassium ions must be present, although sodium ions may also be present.

It is a prime object of this invention to set forth a new crystalline aluminosilicate structure which has good ion exchange and adsorbent properties.

It is further an object of this invention to set out a method of producing a unique zeolite by having potassium ions and vanadia ions present in the synthesis admixture. In more detail, this crystalline aluminosilicate has a formula of $$M_{2/n}O : x\ SiO_2 : Al_2O_3 : Y\ H_2O$$

where M is an alkali cation and n is the valence of this cation, x is the silica content and is in the range of 2.0 to 4.0 and Y is the number of waters of hydration which may be about 2 to 10. This zeolite VK-2 has the following x-ray powder diffraction pattern:

TABLE I

| dA | Intensity | h | k | l | |
|---|---|---|---|---|---|
| 21.5 ± 0.2 | W | 1 | 1 | 0 | |
| 15.2 ± 0.2 | W | 2 | 0 | 0 | |
| 12.3 ± 0.2 | MS | 2 | 1 | 1 | |
| 8.65 ± 0.15 | MS | 2 | 2 | 2 | |
| 7.15 ± 0.15 | M | 4 | 1 | 1, | 3 3 0 |
| 6.20 ± 0.10 | W | 4 | 2 | 2 | |
| 5.05 ± 0.08 | W | 6 | 0 | 0, | 4 4 2 |

TABLE I-continued

| dA | Intensity | h | k | l | |
|---|---|---|---|---|---|
| 4.60 ± 0.05 | W | 5 | 4 | 1 | |
| 4.10 ± 0.05 | W | 5 | 5 | 2, | 6 3 3, 7 2 1 |
| 3.90 ± 0.03 | MS | 7 | 3 | 0 | |
| 3.80 ± 0.03 | W | 7 | 3 | 2, | 6 5 1 |
| 3.70 ± 0.03 | VS | 8 | 1 | 1, | 7 4 1, 5 5 4 |
| 3.39 ± 0.03 | M | 7 | 5 | 2 | |
| 3.31 ± 0.03 | MS | 9 | 1 | 0, | 8 3 3 |
| 3.08 ± 0.03 | M | 8 | 4 | 4 | |
| 2.97 ± 0.03 | VS | 10 | 1 | 1, | 7 7 2 |
| 2.89 ± 0.03 | S | 10 | 2 | 2, | 6 6 6 |
| 2.80 ± 0.02 | W | 10 | 3 | 0, | 8 6 4 |
| 2.75 ± 0.02 | VS | 10 | 4 | 2 | |
| 2.68 ± 0.02 | W | 11 | 2 | 1, | 10 5 1, 9 6 3 |
| 2.62 ± 0.02 | M | 8 | 8 | 2, | 10 4 4 |
| 2.51 ± 0.02 | M | 12 | 0 | 0, | 8 8 4 |
| 2.40 ± 0.02 | W | 11 | 6 | 1, | 10 7 3 |
| 2.37 ± 0.02 | W | 9 | 9 | 0, | etc. |
| 2.33 ± 0.02 | W | 10 | 9 | 2, | etc. |
| 2.23 ± 0.02 | W | 10 | 9 | 1, | etc. |
| 2.21 ± 0.02 | W | 13 | 4 | 1, | etc. | etc. = line corresponds to 3 or more overlapping reflections.

The lines of the X-ray diffraction pattern of VK-2 as shown in Table I can be indexed on the basis of a 30.1A cubic unit cell by use of a computer index program. The cubic unit cell of sodium Type A zeolite when subject to a similar index program is 12.28A. It is also noted that X-ray diffraction lines not allowed by the 30.1A cubic unit cell indexing of VK-2 are also missing in the VK-2 X-ray pattern.

It is found that VK-2 has significant sorbtion capacity for molecules of greater than 6A in diameter such as benzene. Therefore, the sorbtion characteristics of VK-2 indicate the presence of pores or windows in the crystalline structure which comprise 10 and/or 12 rings of $(Si, Al)O_4^{4-}$ tetrahedra. Type A zeolite which possess an 8-ring window will not sorb molecules larger than normal parafins, that is molecules larger than about 4.5A.

VK-2 zeolite may be effectively produced from a total reactant slurry having a composition falling within the following molar concentrations.

$K_2O$ — 2.2 to 4.7
$Na_2O$ — 0.2 to 6.5
$SiO_2$ — 0.5 to 8.0
$Al_2O_3$ — 0.8 to 3.5
$V_2O_5$ — 0.8 to 3.5
$H_2O$ — 70 to 250

However, the total slurry comprises two separately prepared components which themselves are restricted in composition as follows. The weight ratio of A to B may vary between about 2:1 to 25:1.

Solution A

This solution supplies all the vanadia and potassium ions, and is made by mixing together solutions of potassium vanadate and potassium aluminate and silica if present in Solution A. These may be made by dissolving the metal oxide in potassium hydroxide solution, or by dissolving the metal salt in water, or via another salt (e.g., ammonium metavanadate dissolved in KOH). This solution may have the following molar ratios:

$Al_2O_3/V_2O_5$ — 0.5 to 2
$H_2O/K_2O$ — 10 to 20
$Al_2O_3/K_2O$ — 3 to 14
$SiO_2/(Al_2O_3 + V_2O_5)$ — 0 to 0.6

Although soda is not usually added to this solution, it may replace a portion of the potassium ions. This solution is aged at 0° -50° C for between 1 and 10 days.

Solution B

This solution supplies the remainder of the silica and alumina, and has the following mole ratio composition:

$H_2O/Na_2O$ — 15 to 33
$SiO_2/Al_2O_3$ — 5 to 18
$Na_2O/SiO_2$ — 0.7 to 1.8

This solution is aged at about 0 to 100° C for between 0.1 hours and 20 days.

After individually aging Solution A and Solution B, they are admixed in a weight ratio of Solution A to Solution B at about 2:1 to 25:1. The admixture is then aged at about 60° C to reflux for from 4 hours to 50 hours, during which time crystallization occurs. After this period of heating, the solid crystalline material is filtered and washed.

After washing, the zeolite can be dried and activated or it may be cation exchanged with ammonium ion, sodium, lithium, potassium, calcium, magnesium, strontium, barium, the rare earth metal cations, transition metal cations or mixtures of these cations. These VK-2 zeolites have a surface area of about 350-800 m²/g. A small amount of X-alumina may be present as an inert impurity. If the admixture is overaged, the undesirable impurity zeolite F (Barrer, 1954) is formed, along with or replacing VK-2. Depending on the pre-age conditions and slurry stoichiometry zeolites Q (described in U.S. Pat. No. 2,991,151 zeolite L (described in U.S. Pat. No. 3,216,789 ) or zeolite A (described in U.S. Pat. No. 2,882,243) may crystallize with or in place of VK-2.

In addition to zeolite impurities alumina and vanadia have been observed. The appearance of these impurities is very often traced to poor mixing.

Table 2 sets out cation forms of zeolite VK-2 and their adsorption capacities in regard to specific gases. From this data, the selective adsorptivities for various gases can be calculated and thereby the efficiency of the zeolite in a gas fractionating system such as pressureswing heatless fractionation systems.

Table 2

| Cation Form | Gas | Temp. ° C | Amt. Sorbed at 750 mm pressure | |
|---|---|---|---|---|
| Ca | n-Butane | 27 | 9.85 | wt. % |
| Ca | iso-Butane | 0 | 2.6 | |
| Na | " | 0 | 2.6 | |
| Na | " | 27 | 2.2 | |
| Ca | Ethylene | 147 | 5.7 | |
| Ca | " | 27 | 6.0 | |
| Ca | " | 0 | 10.3 | |
| Ca | " | −38 | 10.3 | |
| Ca | " | −70 | 11.0 | |
| Na | " | 110 | 3.5 | |
| Na | " | 26 | 5.4 | |
| Na | " | 0 | 7.2 | |
| K | " | 120 | 4.8 | |
| K | " | 28 | 7.6 | |
| Ca | $CO_2$ | 0 | 19.3 | |
| Na | " | 0 | 17.8 | |
| K | " | 0 | 19.0 | |
| Ca | " | 110 | 10.4 | |
| Na | " | 124 | 8.6 | |
| K | " | 110 | 3.6 | |
| Ca | $N_2$ | −195 | 13.1 | (at 180 mm) |
| Na | " | −195 | 2.5 | " |
| K | " | −195 | 1.6 | " |

The following examples are set out to further amplify the present invention:

EXAMPLE 1

Solution A was made by mixing together 936 gms. ammonium metavanadate, 408 gms. alumina trihydrate and 2920 gms. potassium hydroxide pellets (85 percent KOH) were dissolved in 5600 gms. of water. This solution was aged for seven days at a temperature of 25° C.

Solution B was made by homogenizing a clear sodium aluminate solution comprising 62.4 gms. $Al_2O_3.3 H_2O$, 307 gms. NaOH and 600 gms. $H_2O$, with a sodium silicate solution comprising 1169 gms. sodium silicate (36 Be) in 443 gms. $H_2O$. This solution was aged for two days at 25° C.

400 gms. of Solution A and 40 gms. of Solution B were mixed together and then heated in a flask on a hot plate with continuous agitation. After 4 hours hot aging at 95° C, the mixture was filtered, washed and dried. The product comprised a material having the x-ray diffraction pattern given in Table 1, plus some gibbsite impurity. The chemical analysis is 43.79 $SiO_2$, 35.69 $Al_2O_3$, 0.1 $V_2O_5$, 17.00 $K_2O$ and 3.44 $Na_2O$. Under the electron microscope the product was shown to comprise cubes having edges lens than 0.1 angstroms. Subtraction of the gibbsite component from the chemical analysis yields a zeolite having a weight percent chemical analysis of 43.79 $SiO_2$, 24.1 $Al_2O_3$ (zeolite), 11.6 $Al_2O_3$ (gibbsite), 17.00 percent $K_2O$, 3.44 $Na_2O$ and 0.1 $V_2O_5$ and a $SiO_2/Al_2O_3$ ratio of 3.1. The gibbsite level was estimated by assuming that the $(K_2O + Na_2O)/Al_2O_3$ ratio in the zeolite is unity.

EXAMPLE 2

Solution A is made by adding a solution comprising 203 gms. $NH_4VO_3$, 126 gms. $Al_2O_3.3 H_2O$, 365 gms. KOH and 1200 gms. $H_2O$, to 160 gms. of a colloidal silica solution (30 weight percent $SiO_2$). This solution was aged at 25° C for two days. Solution B was made by dissolving 50 gms. $Al_2O_3.3 H_2O$ in a solution of 307 gms. NaOH in 500 gms. $H_2O$ maintained at 100° C, cooling this aluminate solution, and then mixing this with a diluted sodium silicate solution comprising 1180 gms. commercial sodium silicate (36 Be) and 543 gms. $H_2O$. This Solution B was then aged for two days at 25° C.

400 gms. of Solution A was mixed with 40 gms. of Solution B, and the mixture hot aged for 6 hours on a hot plate at 80° C. The final product had an x-ray diffraction pattern is given in Table 3. The silica/alumina ratio was 2.3.

Table 3

| 2θ° | dÅ | $I/I_o$ |
|---|---|---|
| 4.10 | 21.53 | 3 |
| 5.74 | 15.38 | 4 |
| 7.11 | 12.41 | 37 |
| 10.11 | 8.74 | 33 |
| 12.46 | 7.10 | 21 |
| 14.30 | 6.19 | 4 |
| 17.64 | 5.02 | 8 |
| 19.10 | 4.64 | 4 |
| 21.62 | 4.11 | 2 |
| 22.84 | 3.89 | 35 |
| 23.30 | 3.81 | 6 |
| 23.98 | 3.71 | 60 |
| 26.12 | 3.41 | 29 |
| 27.10 | 3.29 | 35 |
| 29.06 | 3.07 | 16 |
| 29.91 | 2.98 | 100 |
| 30.81 | 2.90 | 36 |
| 31.82 | 2.81 | 2 |
| 32.50 | 2.75 | 60 |
| 33.36 | 2.68 | 8 |
| 34.16 | 2.62 | 27 |
| 35.76 | 2.51 | 25 |
| 37.30 | 2.41 | 4 |
| 38.00 | 2.37 | 6 |
| 38.44 | 2.34 | 4 |
| 40.16 | 2.24 | 4 |
| 40.90 | 2.21 | 2 |

EXAMPLE 3

To illustrate the sorption properties of the calcium and potassium exchanged forms of VK-2, i.e. $Ca^{2+}$ VK-2 and $K^+$ VK-2, a variety of molecular species were adsorbed at various temperatures and pressures. The results are set forth in Table VI. To compare the sorption properties of VK-2 with calcium and potassium exchanged type A zeolite, the published sorption values of $Ca^{2+}A$ and $K^+A$ as shown in U.S. Pat. No. 2,882,243, are included in Table VI below.

TABLE 4

| Sorbate | Molecule Size | $Ca^{2+}$ VK-2 | | | $Ca^{2+}A$ | | |
|---|---|---|---|---|---|---|---|
| | | T° C | Pressure (Torr) | Amount Sorbed (%) | T° C | Pressure (Torr) | Amount Sorbed (%) |
| Benzene | 6.5 | 25 | 50.5 | 2.80 | 25 | 60 | 0* |
| 2-hexene | 5.4 | 25 | 9.0 | 6.6 | — | — | — |
| Iso-hexene | 5.6 | 0 | 7.5 | 8.5 | — | — | — |
| Iso-butene | 5.6 | — | — | — | 25 | 90 | 0.1* |
| n-heptane | 4.5 | 25 | 24.5 | 7.5 | 25 | 45 | 16.6* |
| n-butane | 4.5 | 27 | 750 | 9.9 | 25 | 132 | 13.2* |
| $CO_2$ | | 0 | 750 | 19.3 | 25 | 750 | 24.4* |
| | | $K^+$ VK-2 | | | $K^+A$ | | |
| Ethylene | | 28 | 750 | 7.6 | 25 | 244 | 0* |
| $CO_2$ | | 0 | 750 | 19.0 | 25 | 87 | 0.2* |
| $CO_2$ | 2.8 | 25 | 700 | 14.95 | | | |
| $N_2$ | | −196 | 180 | 1.6 | −196 | 82 | 0.1* |
| n-heptane | 4.9 | 25 | 25.7 | 9.92 | 25 | 25 | 0 |
| 2-hexene | 5.4 | 25 | 25.0 | 3.71 | 25 | 25 | 0 |
| Benzene | 6.5 | 25 | 40.1 | 3.60 | 25 | 40 | 0 |

*U.S. Pat. No. 2,882,243

The data in Table VI shows that both the calcium and potassium exchanged forms of VK-2 have significant sorption capacity for benzene and 2-hexene. This indicates the presence of a planar 10 or 12 ring window in the VK-2 structure. It is also noted that the potassium form of Type A has substantively zero sorption for molecules having effective diameters greater than about 3.2A, i.e., $C_2H_4$, $CO_2$ and $N_2$, whereas $K^+$ VK-2 has appreciable capacity for these molecules.

What is claimed is:

1. Zeolite VK-2 having the formula:

$$M_2O : x\ SiO_2 : Al_2O_3 : Y\ H_2O$$

wherein M is selected from the group consisting of potassium and potassium-sodium mixture, x is 2 to 4 and y is 2 to 10; and an x-ray diffraction pattern consisting of the principal reflections set forth in Table I, said zeolite VK-2 being further characterized by having the capability to sorb benzene.

2. The zeolite of claim 1 wherein the cation M is replaced with at least one cation selected from the group consisting of ammonium, sodium, lithium, calcium, magnesium, barium, strontium, rare earth metal, transition metal and mixtures thereof.

3. The zeolite of claim 1 wherein said zeolite is in the sodium form.

4. The zeolite of claim 1 wherein said zeolite VK-2 is in the calcium form.

5. The zeolite of claim 1 further characterized by a cubic unit cell of about 30.1 A.

6. A method for preparing the zeolite VK-2 of claim 1 comprising:
(a) (1) preparing a first reaction mixture containing the following mol ratio of reactants;
   $H_2O/K_2O$ — 10 to 20
   $Al_2O_3/V_2O_5$ — 0.5 to 2
   $Al_2O_3/K_2O$ — 3 to 14
   $SiO_2/$ — 0 to 0.6
   $Al_2O_3 + V_2O_5$
   and;
(2) reacting said mixture for a period of 1 to 10 days at a temperature of 0 to 50° C;
(b) (1) preparing a second reaction mixture containing the following mol ratio of reactants:
   $H_2O/Na_2O$ — 15 to 33
   $SiO_2/Al_2O_3$ — 5 to 18
   $Na_2O/SiO_2$ — 0.7 to 1.8
   and;
(2) reacting said second mixture for a period of 0.1 hour to 10 days at a temperature of 0° to 100° C.;
(c) combining said first and second reaction mixtures obtained in steps (a) and (b) in amount wherein the weight ratio of said first reaction mixture to said second reaction mixture is in the range of about 2:1 to 25:1 to provide a third reaction mixture having the following mol ratio of reactants:
   $K_2O$ — 2.2 to 4.7
   $Na_2O$ — 0.2 to 6.5
   $SiO_2$ — 0.5 to 8.0
   $Al_2O_3$ — 0.8 to 3.5
   $V_2O_5$ — 0.8 to 3.5
   $H_2O$ — 70 to 250
(d) reacting said third reaction mixture obtained in step (c) at a temperature of about 60° C. to reflux for a period of about 4 to 50 hours; and
(e) recovering the zeolite VK-2 formed during step (d).

7. A method as in claim 6 wherein said zeolite VK-2 is cation exchanged with at least one cation selected from the group consisting of ammonium, sodium, lithium, calcium, magnesium, barium, strontium, rare earth metal, transition metal and mixtures thereof.

8. A method as in claim 7 wherein said cation is selected from the group consisting of sodium and calcium.